United States Patent [19]
Dementi et al.

[11] 3,859,042
[45] Jan. 7, 1975

[54] CONTINUOUS JET PRESSURE STEAMING OF SOLID STATE POLYMERIZED POLYESTER FILAMENTS WITH LESS THAN 22 MEG/KG COOH AND AN INTRINSIC VISCOSITY OF AT LEAST .75 DL.

[75] Inventors: Brian Armstead Dementi, Richmond; Stanley David Lazarus, Petersburg, both of Va.

[73] Assignee: Allied Chemical Corporation, Morristown, N.J.

[22] Filed: July 31, 1972

[21] Appl. No.: 276,503

[52] U.S. Cl.................. 8/115.5, 8/130.1, 8/DIG. 4, 260/75 M, 260/75 T
[51] Int. Cl......................................... C08g 17/003
[58] Field of Search........ 8/DIG. 4; 260/75 T, 75 M

[56] References Cited
UNITED STATES PATENTS

| | | | |
|---|---|---|---|
| 2,934,400 | 4/1960 | Siggel et al. | 260/75 T |
| 3,014,011 | 12/1961 | Zoetbrood | 260/75 T |
| 3,756,990 | 9/1973 | Jaeger et al. | 260/75 M |

FOREIGN PATENTS OR APPLICATIONS

| | | | |
|---|---|---|---|
| 610,183 | 10/1948 | Great Britain | 260/75 T |

OTHER PUBLICATIONS

Auslegeschrift, 1,132,087, June 28, 1962, Eggleston, 5 page Spec., No Dwg.
Review of Textile Progress, Vol. 8, 1956, page 436, Pub. by The Textile Institute, Manchester, England

*Primary Examiner*—Donald Levy
*Attorney, Agent, or Firm*—Fred L. Kelly

[57] ABSTRACT

The preparation of linear high-molecular weight, film and fiber forming polyester having improved adhesion to rubber preparation wherein a polycarboxylic acid is reacted with a polyol and with or without a stabilizer incorporated therein for stabilization and controlling carboxyl end groups wherein the polyester is passed through a chamber of steam at such a temperature, pressure and water concentration and for such a time period so as to improve said polyester's adhesion to rubber.

2 Claims, No Drawings

CONTINUOUS JET PRESSURE STEAMING OF SOLID STATE POLYMERIZED POLYESTER FILAMENTS WITH LESS THAN 22 MEG/KG COOH AND AN INTRINSIC VISCOSITY OF AT LEAST .75 DL.

BACKGROUND OF THE INVENTION

1. Field of the Invention

This invention relates to a linear high-molecular weight, film and fiber forming polyethylene terephthalate polyester having improved adhesion to rubber properties and to a new and novel process for preparing it.

2. Description of the Prior Art

Linear high molecular weight polyethylene terephthalate film and fiber forming polyesters are well known. Such knowledge is well illustrated in U.S. Pat. Nos. 2,465,310; 3,050,533; 3,051,212; 3,427,287 and 3,484,410 as well as many others. Although this product is a highly successful commercial product, naturally, even further improvements are being sought. Greater and greater strength is always being sough and in order to obtain improved thermal stability, lower and lower carboxyl end groups are necessary. Upon obtaining lower carboxyl end groups either by chemical or physical means, adhesion loss of the final textile material to rubber becomes significant. The production of a thermally stable polyester with good adhesion to rubber is, to a great degree, the substance of this invention.

SUMMARY OF THE INVENTION

The present invention provides a highly improved high-molecular weight stable film and fiber forming polyester having improved adhesion to rubber made from polyethylene terephthalate polymer in which the intrinsic viscosity of the polymer is at least 0.75 dl. per gram and having fewer than 22 meg/kg carboxyl end groups.

Further, this invention provides a process for the modification of the surface of a polyester textile material having fewer than 22 meg/kg carboxyl end groups to improve rubber adhesion comprising passing said polyester through a chamber of steam under control conditions.

Still further, this invention provides a process for the modification of the surface of a polyester textile material having fewer than 22 meg/kg carboxyl end groups to improve rubber adhesion comprising reacting an aromatic dicarboxylic acid with a polyol containing 2 to about 10 carbon atoms per molecule under direct esterification conditions in the presence of a compound for stabilizing and controlling carboxyl end groups of said polyester and then passing said polyester through a chamber of steam under controlled conditions.

Even further, this invention provides a stable polyester having improved adhesion to rubber made from polyethylene terephthalate polymer in which the intrinsic viscosity of the polymer is at least 0.75 dl. per gram, having fewer than 22 meg/kg carboxyl end groups, and a compound for the stabilization and control of carboxyl end groups incorporated therein. The specific improvements will be more specifically pointed out in the examples that follow.

Therefore, a primary object of this invention is to produce a high quality, high strength, high molecular weight synthetic linear polyethylene terephthalate polyester textile material having improved adhesion to rubber.

Certain tests utilized in illustrating this invention are defined below. First, the strip adhesion test is carried out as follows:

Strip Adhesion Test

1. A layer of rubber is placed on a fabric winding drum.
2. The test cord is wound onto the drum at 20 ends per inch to obtain a 5 inch width.
3. This rubberized fabric is used to fabricate specimens having the composition shown in the following sketch:

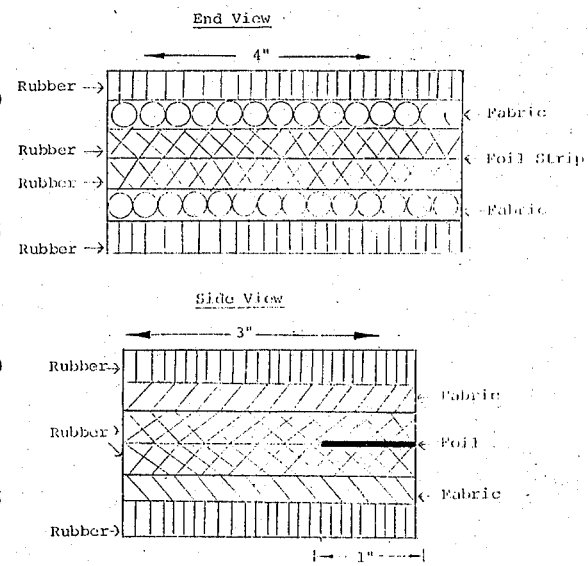

4. This "sandwich" is curved in a mold for 6 minutes at a pressure of 4 tons and a temperature of 350°F.
5. Three 1 × 3 inch strips having the cord parallel to the long dimension are cut from the cured "sandwich".
6. These are pre-heated for 30 minutes at 250°F. and peeled on an Instron tester using 5 inch per minute crosshead speed and 0.5 inch per minute chart speed. Adhesion strength is recorded in pounds.
7. The peeled samples are visually rated on a 1 to 5 scale. If no cord is visible, the rating is 5.0. If equal amounts of rubber and cord are visible in the peeled sample, the rating is 2.5, etc.

"H" Adhesion Test

The H adhesion test is carried out by a modification of ASTM D 2138-67. One quarter inch rubber strips are used to prepare 1,000 denier, 3 ply cord samples and ⅜ inch rubber strips are used to prepare 1,300 denier 3 ply cord samples. Tests are conducted both at room temperature and at elevated temperature (250°F). The samples for elevated temperature testing are pre-heated for 3 minutes at 250°F. before being tested at 250°F. on an Instron Tester which is outfitted with an environmental chamber.

Other terms used throughout the specification and claims are either defined when first used or are known within the art.

3

The following examples further illustrate the present invention only and are not to be considered limiting of the invention in any manner.

EXAMPLE 1

Poly(ethylene terephthalate) chips having an intrinsic viscosity, (I.V.) of 0.53 dl/g and carboxyl end group content (COOH) of 26 meg/kg were solid-state polymerized by tumbling for 30 hours at a temperature of 200°C (and a pressure of 0.5 torr). The resulting polymer was insoluble under conditions normally used in the determination of I.V. and COOH. This polymer was spun and drawn into a 1,300 denier, 192 filament yarn having I.V. = 0.74 dl/gm and COOH = 10 meg/kg. Three ply 8S × 8Z cord was made and treated on a Litzler single end unit with dips consisting of first blocked diisocyanate and diepoxide and second resorcinol formaldehyde-butadiene styrene, vinyl pyridine latex. The treated cords were cured within rubber and tested for adhesion using the ⅜ inch H test, hot and cold and the strip adhesion test. Results are presented in Table I.

EXAMPLE 2

Approximately 700 yards of the greige cord of Example 1 was passed through a steam jet at a steam pressure of 92 psig at the rate of 80 feet per minute. This cord was then treated on the Litzler unit and tested for adhesion as in Example 1. Results are tabulated in Table I.

EXAMPLE 3

10 pounds of the solid state polymerized chips of Example 1 were coated with 0.05 percent of dichloro-di-2-pyridylamine-copper II complex. These chips were spun and drawn into 1,300 denier, 192 filament yarn having I.V. = 0.74 dl/gm and COOH = 6 meg/kg. Three ply 8S × 8Z cord was prepared and treated in the Litzler unit as in Example 1. Adhesion specimens were prepared and tested. Results are shown in Table I.

EXAMPLE 4

A portion of the greige cord of Example 3 was treated in a steam jet using the conditions of Example 2. The cord was then treated in the Litzler unit and cured into rubber for adhesion testing. Adhesion results are shown in Table I.

EXAMPLE 5

Polyethylene terephthalate polymer was spun and drawn into 1,000 denier, 192 filament yarn having I.V. = 0.84 dl/gm and COOH end groups = 21 meg/kg. This yarn was twisted into 3 ply cord having 9 tpi S twist and 9 tpi Z twist. The cord was treated on the Litzler unit as in Example 1 and ¼ inch H adhesion and strip adhesion specimens were prepared. Adhesion results are tabulated in Table I.

EXAMPLE 6

Greige cord from Example 5 was passed through a steam jet at 120 psig at the rate of 120 feet per minute. Measured steam temperature was 296°–300°C. This cord was treated on the Litzler unit, cured in rubber and tested as in Example 5. Results are shown in Table I.

EXAMPLE 7

Polymer chips from the batch used in Example 5 were dry coated with 0.05 percent dichloro-di-2-pyridylamine copper II complex and spun into 1,000 denier, 192 filament yarn having I.V. = 0.82 dl/gm, COOH = 14 meg/kg. This yarn was converted to cord, treated and tested for adhesion as in Example 5. Results are presented in Table I.

EXAMPLE 8

Greige cord from Example 7 was treated in a steam jet as in Example 6. This cord was treated and tested as in Example 6. Results are tabulated in Table I.

EXAMPLE 9

Twenty-five hundred yards of the yarn produced in Example 5 were passed through a steam jet at 120 psig at the rate of 150 feet per minute. The yarn was then twisted, treated and tested for adhesion as in Example 5. Adhesion results are shown in Table I.

TABLE I

MEASURED ADHESION OF TIRE CORDS

| Source of Cord | Steam Tested | Cold H Adhesion* n | $\overline{X}$(lbs) | Hot H Adhesion* n | $\overline{X}$(lbs) | Strip Adhesion n | $\overline{X}$(lbs) | Rating |
|---|---|---|---|---|---|---|---|---|
| Example 1 | No | 42 | 43 | 42 | 30 | 6 | 35 | 4.6 |
| Example 2 | Yes | 42 | 50 | 42 | 34 | 6 | 37 | 4.8 |
| Example 3 | No | 42 | 41 | 42 | 28 | 6 | 33 | 4.5 |
| Example 4 | Yes | 42 | 48 | 42 | 32 | 6 | 36 | 4.7 |
| Example 5 | No | 42 | 35 | 42 | 20 | 6 | 29 | 4.8 |
| Example 6 | Yes | 42 | 37 | 42 | 23 | 6 | 30 | 5.0 |
| Example 7 | No | 42 | 33 | 42 | 18 | 6 | 27 | 4.7 |
| Example 8 | Yes | 42 | 36 | 42 | 21 | 6 | 29 | 4.9 |
| Example 9 | Yes | 42 | 38 | 42 | 24 | 6 | 30 | 5.0 |

Comparing the odd numbered examples without steam treatment with the following even numbered examples which are similar except for steam treatment, it can be seen that the adhesion is significantly improved by steam treatment. Example 9 compared with Example 5 shows that steam treatment of yarn is at least as effective as steam treatment of cord in improving the final cord adhesion.

*⅜ inch H adhesion test was used for Examples 1–4, and ¼ inch H adhesion test was used in Examples 5–9.

EXAMPLE 10

Three ends of polyethylene terephthalate yarn having an intrinsic viscosity of 0.88 and carboxyl end group level of 21 eq/$10^6$ grams were plied and twisted into a cord sample. A portion of this cord sample was passed through a steam jet where steam emerging from a heated (298°C.) and pressurized (92 lbs/in²) vessel impinged on the cord. The rate of movement of the cord through the jet was 80 feet per minute. Such treatment was without effect on the I.V. of the yarn. Two portions of the steam treated cord and a control portion were submitted for hot ⅜ inch H adhesion and strip adhesion tests. Results are as follows:

|  | I.V. | COOH | ⅜" Hot* H Adhesion, lbs. | Strip Adhesion Bond Strength, lbs. | Rating |
|---|---|---|---|---|---|
| Control | 0.89 | 21 | 28 | 31 | 4.7 |
| Steam Treated Sample | 0.89 | 21 | 29 | 35 | 5.0 |
| Steam Treated Sample | 0.88 | 20.5 | 31 | 34 | 5.0 |

* = Tested at 250°F.

By using the teachings of this invention, one advantage is to obtain a polyethylene terephthalate film and fiber forming polyester having not only greater thermal stability but having greater adhesion to rubber for use in the tire and industrial market. Other advantages are that the yarns of this invention can be further modified, if desired, by after treatments, such as stress relaxation and tensilization, as well as others known to those skilled in the art.

As many widely different embodiments can be made without departing from the spirit and scope of this invention, it is to be understood that said invention is not to be restricted in any way except as set forth in the appended claims.

We claim:

1. In a process for preparing polyethylene terephthalate tire cord from polyethylene terephthalate polymer chips having an intrinsic viscosity less than 0.75 dl. per gram and greater than 22 meq/kg. carboxyl end groups, wherein said polymer chips are heated under solid state polymerization conditions until the polymer has an intrinsic viscosity greater than 0.75 dl. per gram and less than 22 meq/kg. carboxyl end groups, melt-spinning and drawing said polymer to form a polyethylene terephthalate yarn, and forming tire cord from said yarn by plying and twisting three ends of said yarn, the improvement comprising passing said tire cord through a steam jet at a rate of about 50 feet per minute to about 12,000 feet per minute, said steam having a jet pressure of about 50 p.s.i.g. to about 300 p.s.i.g., and a temperature of about 200°C. to about 400°C., whereby the adhesion bond strength of the tire cord to rubber is improved without significant change in the overall intrinsic viscosity of the polyester in said tire cord.

2. The process of claim 1 wherein the tire cord is passed through the steam jet at a rate of 80 feet per minute, said steam having a pressure of 92 p.s.i.g. and a temperature of 298°C.

* * * * *

UNITED STATES PATENT OFFICE
CERTIFICATE OF CORRECTION

Patent No. 3,859,042  Dated January 7, 1975

Inventor(s) Brian Armstead Dementi and Stanley David Lazarus

It is certified that error appears in the above-identified patent and that said Letters Patent are hereby corrected as shown below:

Column 1, line 3, "22 MEG/KG" should read --22 MEQ/KG--.
Column 1, line 22, "sough" should read --sought--.
Column 1, line 37, "22 meg/kg" should read --22 meq/kg--.
Column 1, line 42, "22 meg/kg" should read --22 meq/kg--.
Column 1, line 48, "22 meg/kg" should read --22 meq/kg--.
Column 1, line 60, "22 meg/kg" should read --22 meq/kg--.
Column 3, line 8, "26 meg/kg" should read --26 meq/kg--.
Column 3, line 14, "10 meg/kg" should read --10 meq/kg--.
Column 3, line 37, "6 meg/kg" should read --6 meq/kg--.
Column 4, line 4, "21 meg/kg" should read --21 meq/kg--.
Column 4, line 25, "14 meg/kg" should read --14 meq/kg--.
Column 6, line 1, "22 meg/kg" should read --22 meq/kg--.
Column 6, line 17, "22 meg/kg" should read --22 meq/kg--.

Signed and Sealed this ninth Day of December 1975

[SEAL]

Attest:

RUTH C. MASON
Attesting Officer

C. MARSHALL DANN
Commissioner of Patents and Trademarks